US009032927B1

(12) United States Patent
Redon

(10) Patent No.: US 9,032,927 B1
(45) Date of Patent: May 19, 2015

(54) COLD-START STRATEGIES FOR OPPOSED-PISTON ENGINES

(71) Applicant: Achates Power, Inc., San Diego, CA (US)

(72) Inventor: Fabien G. Redon, San Diego, CA (US)

(73) Assignee: ACHATES POWER, INC., San Diego, CA (US)

( * ) Notice: Subject to any disclaimer, the term of this patent is extended or adjusted under 35 U.S.C. 154(b) by 32 days.

(21) Appl. No.: 14/075,323

(22) Filed: Nov. 8, 2013

(51) Int. Cl.
*F02D 41/06* (2006.01)
*F02B 75/12* (2006.01)

(52) U.S. Cl.
CPC ............... *F02B 75/12* (2013.01); *F02D 41/064* (2013.01)

(58) Field of Classification Search
CPC . F02D 41/062; F02D 41/064; F02D 41/0047; F02D 41/005; F02N 19/001; F02N 19/012; F02N 2200/023; F02N 2200/024; F02N 2200/121; F02N 2300/2002; F02N 2300/2004; F02N 2300/2008
USPC ................... 123/179.1–179.25, 51 R–51 BD, 123/158.11–568.32; 701/113
See application file for complete search history.

(56) References Cited

U.S. PATENT DOCUMENTS

| 2,691,968 | A | * | 10/1954 | Barber | 123/301 |
|---|---|---|---|---|---|
| 4,938,180 | A | | 7/1990 | King | 123/180 |
| 5,058,536 | A | * | 10/1991 | Johnston | 123/51 BA |
| 5,367,996 | A | | 11/1994 | Homil | 123/179.8 |
| 5,540,193 | A | | 7/1996 | Achten | 123/46 |
| 6,092,496 | A | | 7/2000 | Bhargava | 123/90.15 |
| 6,959,672 | B1 | * | 11/2005 | Peng et al. | 123/46 R |
| 7,395,809 | B2 | | 7/2008 | Moller | 123/376 |
| 8,006,672 | B2 | * | 8/2011 | Krenus et al. | 123/492 |
| 8,050,844 | B2 | | 11/2011 | Hoard | 701/103 |
| 8,265,856 | B2 | | 9/2012 | Hoard | |
| 8,549,854 | B2 | * | 10/2013 | Dion et al. | 60/605.2 |
| 8,775,054 | B2 | * | 7/2014 | Vincenzi et al. | 701/103 |
| 2005/0274332 | A1 | * | 12/2005 | Lemke et al. | 123/41.35 |
| 2008/0066724 | A1 | | 3/2008 | Klingebiel | 123/568.12 |
| 2009/0159022 | A1 | * | 6/2009 | Chu | 123/52.2 |
| 2009/0240419 | A1 | | 9/2009 | Hoard | 701/103 |
| 2010/0179743 | A1 | * | 7/2010 | Surnilla et al. | 701/103 |
| 2010/0192923 | A1 | * | 8/2010 | Cox | 123/51 BC |
| 2010/0206257 | A1 | * | 8/2010 | Van den Bergh | 123/179.17 |
| 2010/0282219 | A1 | * | 11/2010 | Alonso | 123/51 AA |

(Continued)

FOREIGN PATENT DOCUMENTS

| EP | 2077382 A1 | 8/2009 |
|---|---|---|
| GB | 510542 A | 8/1939 |

(Continued)

OTHER PUBLICATIONS

International Search Report for PCT/US2011/061381, mailed Apr. 12, 2013.

(Continued)

*Primary Examiner* — Marguerite McMahon
(74) *Attorney, Agent, or Firm* — Terrance A. Meador

(57) ABSTRACT

A strategy to cold-start an opposed-piston engine includes, before injecting fuel, preventing air flow through the engine while cranking the engine to heat air retained in the engine, followed by controlling mass air flow through and fuel injection into a cylinder of the engine according to cold-start schedules so as to create and preserve heat for stable engine firing and transition to an idling state of operation.

20 Claims, 8 Drawing Sheets

(56) References Cited

U.S. PATENT DOCUMENTS

| | | | |
|---|---|---|---|
| 2011/0106414 A1* | 5/2011 | Leanos et al. | 701/113 |
| 2011/0192143 A1 | 8/2011 | Andersson | 60/274 |
| 2011/0289916 A1* | 12/2011 | Dion et al. | 60/605.2 |
| 2012/0029791 A1 | 2/2012 | Hoard | 701/103 |
| 2012/0125298 A1 | 5/2012 | Lemke et al. | |
| 2012/0210985 A1* | 8/2012 | Fuqua et al. | 123/51 B |
| 2013/0104848 A1 | 5/2013 | Klyza et al. | |
| 2013/0297182 A1 | 11/2013 | Vincenzi et al. | |
| 2014/0058651 A1* | 2/2014 | Eisenhour | 701/113 |
| 2015/0033736 A1 | 2/2015 | Kalebjian et al. | |

FOREIGN PATENT DOCUMENTS

| | | | |
|---|---|---|---|
| WO | WO 2013013756 | 1/2013 | F02D 41/40 |
| WO | WO-2013/062921 A1 | 5/2013 | |
| WO | WO-2013/126347 A1 | 8/2013 | |

OTHER PUBLICATIONS

Written Opinion for PCT/US2011/061381, mailed May 8, 2014.
International Search Report for PCT/US2013/026737, mailed Jun. 26, 2013.
Written Opinion for PCT/US2013/026737, mailed Jun. 26, 2013.
International Search Report/Written Opinion for PCT/US2014/060425, mailed Jan. 8, 2015.

* cited by examiner

COLD-START STRATEGIES FOR OPPOSED-PISTON ENGINES

RELATED APPLICATIONS

This application contains subject matter related to the subject matter of co-pending U.S. patent application Ser. No. 13/654,340 for "Fuel Injection Strategies in Opposed-Piston Engines with Multiple Fuel Injectors", published as US 2013/0104848, and co-pending U.S. patent application Ser. No. 14/039,856 for "EGR Constructions for Opposed-Piston Engines", whose parent has issued as U.S. Pat. No. 8,549,854. The subject matter of this application is also related to that of PCT application US2013/026737 for "Exhaust Management Strategies for Opposed-Piston, Two-Stroke Engines".

BACKGROUND

The field of this disclosure relates to vehicle engines, specifically to two-stroke cycle, opposed-piston engines constructed for compression ignition.

Ambient environmental conditions can affect combustion behavior of a compression-ignition engine. For example, a compression-ignition engine installed in a vehicle frequently requires assistance when starting cold in low temperature conditions. In this regard, effective combustion is dependent on achieving a high temperature by compression of air in the bore of a cylinder. However, under cold ambient and engine conditions the air drawn into the engine may be too cold to support combustion when the engine is started. Further, as the engine is cranked, the heat of compression is drawn away from the combustion chamber by the cold engine parts. In some cases, for example during winter, a minimally-equipped compression-ignition engine may require long periods of cranking in order to raise the temperature of the combustion chamber elements to a level that supports ignition, effective combustion, and minimal pollution.

A compression-ignition engine may be equipped with one or more of glow plugs, block heaters, intake heaters, ether injection, and/or other aids to facilitate start-up under cold conditions. However, these solutions bring added complexity and expense to the construction and operation of such an engine.

An opposed-piston engine is a type of compression-ignition engine in which effective combustion is dependent on achieving a high temperature by compression of air between adjacent end surfaces of a pair of pistons disposed for opposed movement in the bore of a cylinder. Advantages in engine architecture and two-stroke operation enable opposed-piston engines to deliver superior fuel, weight, and volume efficiencies when compared with conventional single-piston compression-ignition engines. A two-stroke cycle, opposed-piston engine must be able to start quickly and operate effectively in cold ambient conditions, with as little derogation of its inherent advantages as possible. It is therefore desirable to provide a strategy for starting a compression-ignition, opposed-piston engine under cold conditions while minimizing any added complexity and expense.

SUMMARY

The desired objective and other advantages are achieved by way of methods and systems that implement and execute strategies for starting a compression-ignition, opposed-piston engine in cold conditions. In this regard, a "cold start strategy" is a series of steps or procedures taken to fire up an engine in response to detection of thermal conditions indicating possible difficulty in starting. In this description, a cold-start strategy includes actions to be taken by specific components or elements of the engine under governance of a control mechanization to start an engine under cold conditions. A cold start strategy includes controlling mass air flow through, and fuel injection into, a cylinder of the engine according to cold-start schedules that create and preserve heat for successful engine firing and transition to an idling state.

A cold-start strategy is embodied in a method of operating an opposed-piston engine with one or more cylinders, in which each cylinder has an exhaust port coupled to an exhaust subsystem and an intake port coupled to a charge air subsystem, a pair of pistons disposed for opposing movement in a bore of the cylinder, and one or more fuel injectors disposed for injecting fuel into the cylinder. The method includes generating an engine start signal. If a cold-start condition is detected following the start signal, the engine is cranked before fuel is injected and charge air flow through the cylinder is reduced, or blocked, while air in a cylinder is continually heated by compression while cranking the engine. Then fuel is injected into cylinder space between opposing end surfaces of pistons in the cylinder according to a cold-start schedule and the flow of charge air through the cylinder is increased until an idling state of engine operation is reached. When the idling state is reached, combustion control is passed to an idle governor.

In some aspects, the engine may be prepared for an anticipated cold start by conditioning air in a cylinder during shutdown of the engine. In this regard, conditioned air is air with little or no exhaust products remaining that is retained in the engine at the end of shut down.

A cold-start strategy is enabled by a cold-start system for an opposed-piston engine with one or more cylinders, in which each cylinder has an exhaust port coupled to an exhaust subsystem and an intake port coupled to a charge air subsystem, a pair of pistons disposed for opposing movement in a bore of the cylinder, and one or more fuel injectors disposed for injecting fuel into the cylinder. The cold-start system includes a starter motor operable to crank the engine during start-up, a backpressure valve in the exhaust subsystem, and a supercharger in the charge air subsystem having an input and an output. An intake manifold in the charge air subsystem is coupled to the output of the supercharger and is in fluid communication with the intake port, and a recirculation path in the charge air subsystem couples the output of the supercharger to the input of the supercharger. An engine control mechanization is operable to detect a cold-start condition and to operate the starter, the backpressure valve, the recirculation path, and the fuel injectors in response to the cold-start condition by closing the backpressure valve and opening the recirculation path to reduce charge air flow through the cylinder and cranking the engine to heat air by compression in the cylinder before fuel is injected. The engine control mechanization is further operable to cause the fuel injectors to inject fuel into a combustion chamber defined between opposing end surfaces of pistons in the cylinder according to a cold-start schedule, and to progressively open the backpressure valve and close the recirculation path to increase the flow of charge air through the cylinder until an engine idling state is reached.

A cold-start strategy is embodied in a method of operating an opposed-piston engine with an exhaust subsystem, a charge air subsystem, an EGR channel coupling the exhaust subsystem to the charge air subsystem, and one or more cylinders, in which each cylinder has an exhaust port coupled to the exhaust subsystem and an intake port coupled to the charge air subsystem, a pair of pistons disposed for opposing movement in a bore of the cylinder, and one or more fuel injectors disposed for injecting fuel into the cylinder. The method includes, during shut down of the engine, closing the EGR channel, and then ceasing fuel injection into the cylinder and flushing charge air containing exhaust products from the cylinder. Then when a cold-start condition is detected during engine start-up the engine is operated by, before fuel is injected, reducing, or blocking, charge air flow through a cylinder while compression-heating conditioned air in the cylinder by cranking the engine. A cold-start sequence of fuel pulses is injected into the cylinder while the flow of charge air through the cylinder is increased until an engine idling state is reached. When the idling state is reached, an idling sequence of fuel pulses is injected into the cylinder

BRIEF DESCRIPTION OF THE DRAWINGS

The below-described drawings are intended to illustrate examples discussed in the following description. The drawings include schematic drawings that represent elements of a compression-ignition, opposed-piston engine by means of well-understood and widely-employed symbols.

DETAILED DESCRIPTION

A compression-ignition engine for a vehicle is an internal combustion engine in which the heat of compressed air ignites fuel injected into, and mixed with, the air as it is compressed. A two-stroke cycle engine is a type of compression-ignition engine that completes a power cycle with a single complete rotation of a crankshaft and two strokes of a piston connected to the crankshaft. An opposed-piston engine is a two-stroke cycle, compression-ignition, internal combustion engine in which two pistons are disposed in opposition in the bore of a cylinder for reciprocating movement in opposing directions. The cylinder has longitudinally-spaced inlet and exhaust ports that are located near respective ends of the cylinder. Each of the opposed pistons controls one of the ports, opening the port as it moves to a bottom center (BC) location, and closing the port as it moves from BC toward a top center (TC) location. One of the ports provides passage for the products of combustion out of the bore, the other serves to admit charge air into the bore; these are respectively termed the "exhaust" and "intake" ports. In a uniflow-scavenged opposed-piston engine, charge air enters a cylinder through its intake port as exhaust gas flows out of its exhaust port, thus gas flows through the cylinder in a single direction ("uniflow")—from intake port to exhaust port.

In this disclosure, "fuel" is any fuel that may be ignited by compression of air in an opposed-piston engine. The fuel may be a relatively homogeneous composition, a blend, a mixture of fuels, or separate injections of different fuels. For example, the fuel may be a gaseous fuel, a liquid fuel, or any other fuel ignitable by compression ignition. In some aspects, fuel may be injected into compressed air in a combustion chamber when opposed pistons are at or near TC locations. In other aspects, injection may occur earlier in the compression stroke, soon after port closure. The air is preferably pressurized ambient air; however, it may include other components such as exhaust gases or other diluents. In any such case, the air is referred to as "charge air."

Figure 1:
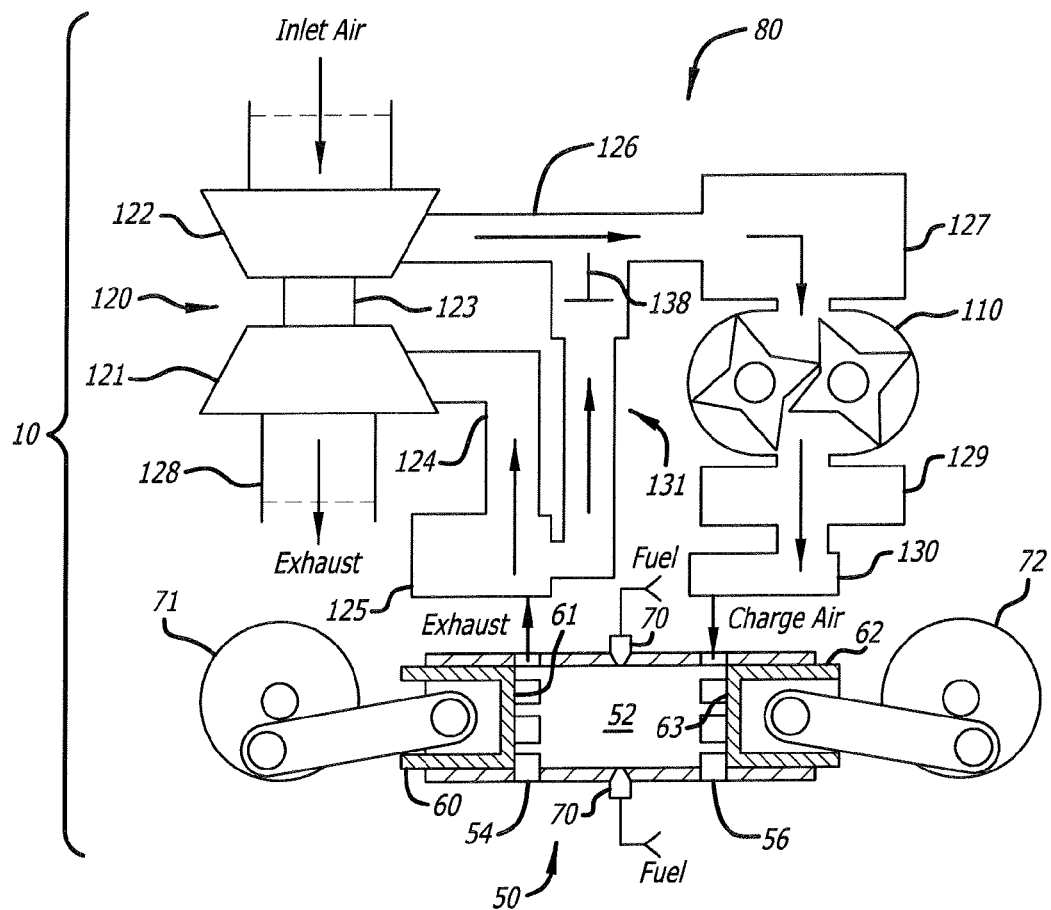
FIG. 1 is a schematic diagram of a prior art two-stroke cycle, opposed-piston engine constructed for compression ignition, and is appropriately labeled "Prior Art".

FIG. 1 illustrates a prior-art two-stroke cycle, compression-ignition, opposed-piston engine 10 as would be used, for example, in a vehicle. The engine 10 has at least one ported cylinder 50. For example, the engine may have one ported cylinder, two ported cylinders, three ported cylinders, or four or more ported cylinders. Each ported cylinder 50 has a bore 52 and longitudinally-spaced exhaust and intake ports 54 and 56 formed or machined in respective ends of a cylinder wall. Each of the exhaust and intake ports 54 and 56 includes one or more circumferential arrays of openings in which adjacent openings are separated by a solid bridge. In some descriptions, each opening is referred to as a "port"; however, the construction of a circumferential array of such "ports" is no different than the port constructions shown in FIG. 1. Pistons 60 and 62 are slidably disposed in the bore 52 with their end surfaces 61 and 63 opposing one another. The piston 60 controls the exhaust port 54, and the piston 62 controls the intake port 56. In the example shown, the engine 10 further includes at least one crankshaft; preferably, the engine includes two crankshafts 71 and 72. In the example shown, the exhaust pistons 60 of the engine are coupled to the crankshaft 71, and the intake pistons 62 of the engine are coupled to the crankshaft 72.

As the pistons 60 and 62 near TC, a combustion chamber is defined in the bore 52 between the end surfaces 61 and 63 of the pistons. Combustion timing is frequently referenced to the point in a compression cycle where minimum combustion chamber volume occurs; this point is referred to as "minimum volume." Fuel is injected directly into cylinder space located between the end surfaces 61 and 63. In some instances injection occurs at or near minimum volume; in other instances, injection may occur before minimum volume. Fuel is injected through at least one fuel injector nozzle 70 positioned in an opening through the sidewall of a cylinder 50; preferably, the engine includes two fuel injector nozzles 70. The fuel mixes with charge air admitted into the bore through the intake port 56. As the air-fuel mixture is compressed between the end surfaces the compressed air reaches a temperature that causes the fuel to ignite. Combustion follows.

With further reference to FIG. 1, the engine 10 includes an air handling system 80 that manages the transport of charge air provided to, and exhaust gas produced by, the engine 10. A representative air handling system construction includes a charge air subsystem and an exhaust subsystem. In the air handling system 80, a charge air source receives fresh air and processes it into charge air. The charge air subsystem receives the charge air and transports it to the at least one intake port of the engine. The exhaust subsystem transports exhaust products from exhaust ports of the engine for delivery to other exhaust components.

The air handling system 80 includes a turbocharger 120 with a turbine 121 and a compressor 122 that rotate on a common shaft 123. The turbine 121 is coupled to the exhaust subsystem and the compressor 122 is coupled to the charge air subsystem. The turbocharger 120 extracts energy from exhaust gas that exits the exhaust ports 54 and flows into an exhaust channel 124 directly from the exhaust ports 54, or from an exhaust manifold assembly 125 that collects exhaust gasses output through the exhaust ports 54. In this regard, the turbine 121 is rotated by exhaust gas passing through it into an exhaust outlet 128. This rotates the compressor 122, causing it to generate charge air by compressing fresh air. The charge air subsystem includes a supercharger 110 and an intake manifold 130. The charge air subsystem further includes at least one air cooler coupled to receive and cool the charge air before delivery to the intake port or ports of the engine. The charge air output by the compressor 122 flows through a charge air channel 126 to a cooler 127, whence it is pumped by the supercharger 110 to the intake ports. Charge air compressed by the supercharger 110 is output to an intake manifold 130. The intake ports 56 receive charge air pumped by the supercharger 110, through the intake manifold 130. Preferably, in multi-cylinder opposed-piston engines, the intake manifold 130 is constituted of an intake plenum that communicates with the intake ports 56 of all cylinders 50. A second cooler 129 may be provided between the output of the supercharger 110 and the input to the intake manifold 130.

In some aspects, the air handling system 80 may be constructed to reduce NOx emissions produced by combustion by recirculating exhaust gas through the ported cylinders of the engine. The recirculated exhaust gas is mixed with charge air to lower peak combustion temperatures, which reduces production of NOx. This process is referred to as exhaust gas recirculation ("EGR"). The EGR construction shown obtains a portion of the exhaust gasses flowing from the port 54 during scavenging and transports them via an EGR channel 131 external to the cylinder into the incoming stream of fresh intake air in the charge air subsystem. The recirculated exhaust gas flows through the EGR channel 131 under the control of a valve 138 (this valve may also be referred to as the "EGR valve").

The implementation of a cold-start strategy for an opposed-piston engine such as that shown in FIG. 1 involves a number of engine systems, including air handling and fuel injection systems, which are used to execute the strategy, as well as thermal management systems, which provide data used to guide the execution of the strategy and which can also contribute to execution.

Figure 2:
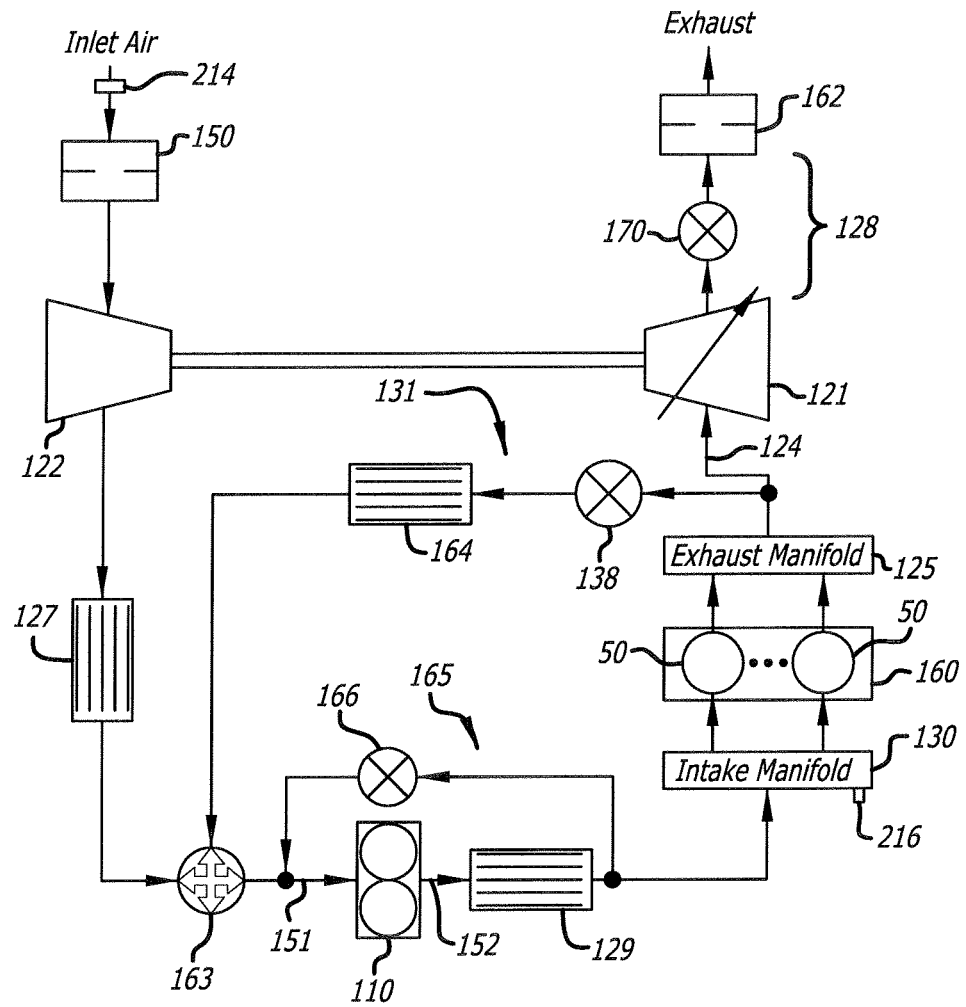
FIG. 2 is a schematic diagram showing details of an air handling system for a compression-ignition, opposed-piston engine according to this disclosure.

Using the engine of FIG. 1 as a basis, FIG. 2 shows modifications and additions with which the air handling system 80 may be configured to implement a cold-start strategy according to this specification. In this regard, the charge air subsystem provides inlet air to the compressor 122 via an air filter 150. As the compressor is rotated, the compressed inlet air flows through the cooler 127 into the inlet 151 of the supercharger 110. Air pumped by the supercharger 110 flows through the supercharger's outlet 152 into the intake manifold 130. Pressurized charge air is delivered from the intake manifold 130 to the intake ports of the cylinders 50, which are supported in an engine block 160. In some instances, although not necessarily, the second cooler 129 is provided in the charge air subsystem, in series between the output of the supercharger 110 and the intake manifold 130. In other instances, there may be no second cooler 129 in the charge air subsystem.

Exhaust gasses from the exhaust ports of the cylinders 50 flow from the exhaust manifold assembly 125 into the inlet of the turbine 121, and from the turbine's outlet into the exhaust outlet channel 128. In some instances, one or more after-treatment devices 162 are provided in the exhaust channel 128. Exhaust is recirculated through the EGR channel 131, under control of the EGR valve 138. The EGR channel 131 is coupled to the charge air subsystem via the EGR mixer 163. In some instances, although not necessarily, an EGR cooler 164 is provided in the EGR channel 131, in series between the EGR valve 138 and the EGR mixer 163. In other instances, there may be no cooler in the EGR channel 131.

With further reference to FIG. 2, the air handling system 80 is equipped for control of gas flow at separate control points in the charge air and exhaust subsystems. In the charge air subsystem, charge air flow and boost pressure are controlled by operation of a recirculation path 165 coupling the output 152 of the supercharger to the supercharger's input 151. The recirculation path 165 includes a valve (the "recirculation valve") 166 that governs the flow of charge air into, and thus the pressure in, the intake manifold 130. A valve (the "backpressure valve") 170 in the exhaust outlet 128 governs the flow of exhaust out of, and thus the backpressure in, the exhaust subsystem. As per FIG. 2, the backpressure valve is positioned in the exhaust outlet 128, between the output of the turbine 121 and the after-treatment devices 162.

In some instances, additional control of gas flow (and pressure) is provided by way of a variable speed supercharger and/or a variable-geometry turbine. Thus, in some aspects the supercharger 110 is coupled by a drive mechanism (not shown) to a crankshaft, or another rotating element of the engine, to be driven thereby. The drive mechanism can comprise a stepwise transmission, or continuously variable transmission (CVT), device, in which cases, charge air flow, and boost pressure, may be varied by varying the speed of the supercharger 110 in response to a speed control signal provided to the drive mechanism. In other instances, the supercharger may be a single-speed device. In other aspects, the turbine 121 may be a variable-geometry device having an effective aspect ratio that may be varied in response to changing speeds and loads of the engine.

Figure 3:
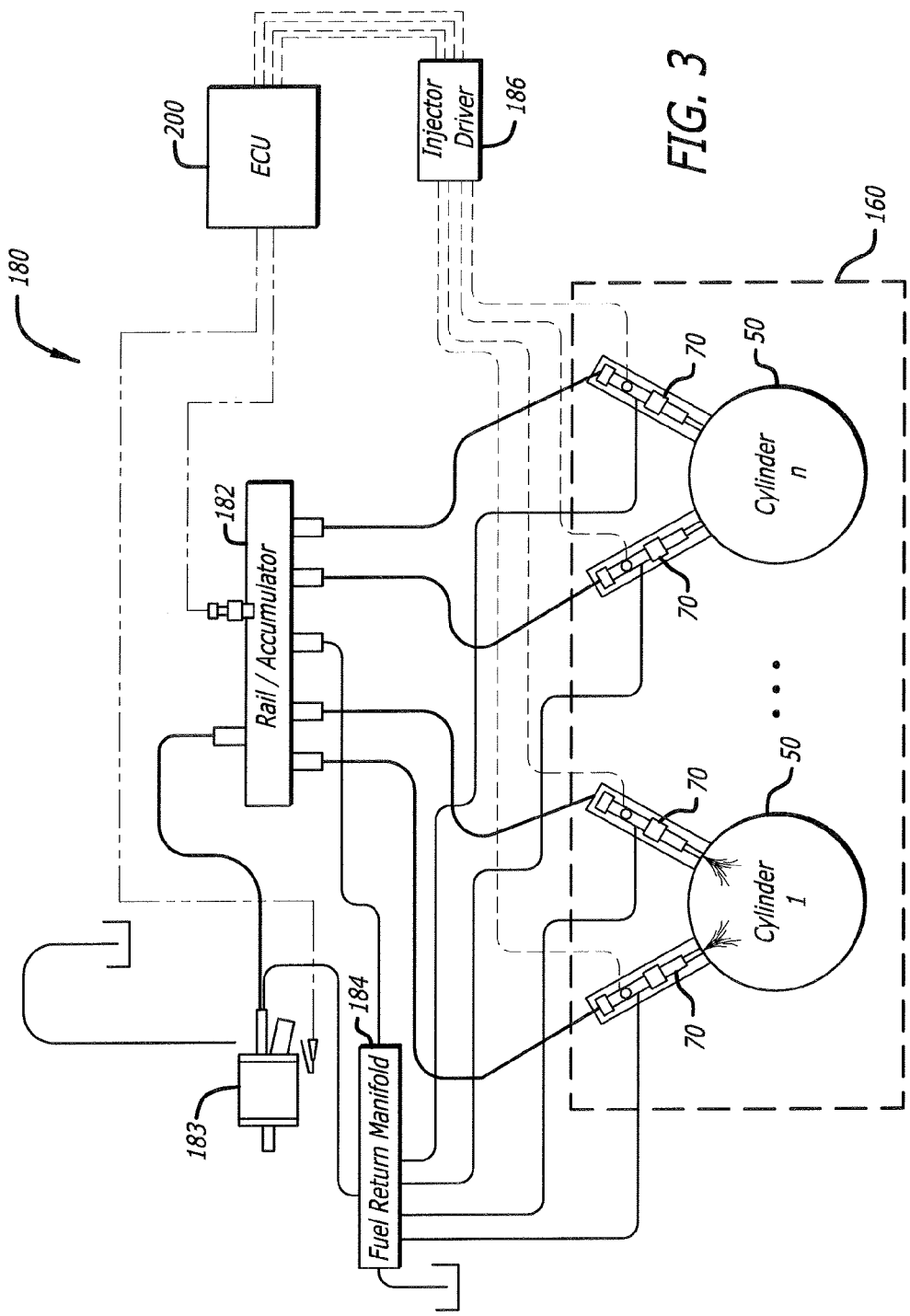
FIG. 3 is a schematic diagram showing details of a fuel injection system for a compression-ignition, opposed-piston engine according to this disclosure.

FIG. 3 shows a fuel injection system that may be configured to contribute to the execution of a cold-start strategy according to this specification. The fuel injection system 180 delivers fuel to each cylinder 50 by injection into the cylinder. Preferably, each cylinder 50 is provided with multiple fuel injectors 70 mounted for direct injection into cylinder space between the end surfaces of the pistons. For example, each cylinder 50 has two fuel injectors 70. Preferably, fuel is fed to the fuel injectors 70 from a fuel source 182 that includes a rail/accumulator mechanism to which fuel is pumped by a fuel pump 183. A fuel return manifold 184 collects fuel from the fuel injectors 70 and the fuel source 182 for return to a reservoir from which the fuel is pumped. Although FIG. 3 shows the fuel injectors 70 of each cylinder disposed at an angle of less than 180°, this is merely a schematic representation and is not intended to be limiting with respect to the locations of the injectors or the directions of the sprays that they inject. In one preferred configuration, the injector nozzles are disposed for injecting fuel sprays in diametrically opposing directions along a common axis. Preferably, each fuel injector 70 includes or is associated with an electrically-operated actuator (such as a solenoid) that operates the injector. Preferably, the actuator is controlled by a respective drive signal produced by an electronic multichannel injector driver 186.

Figure 4:
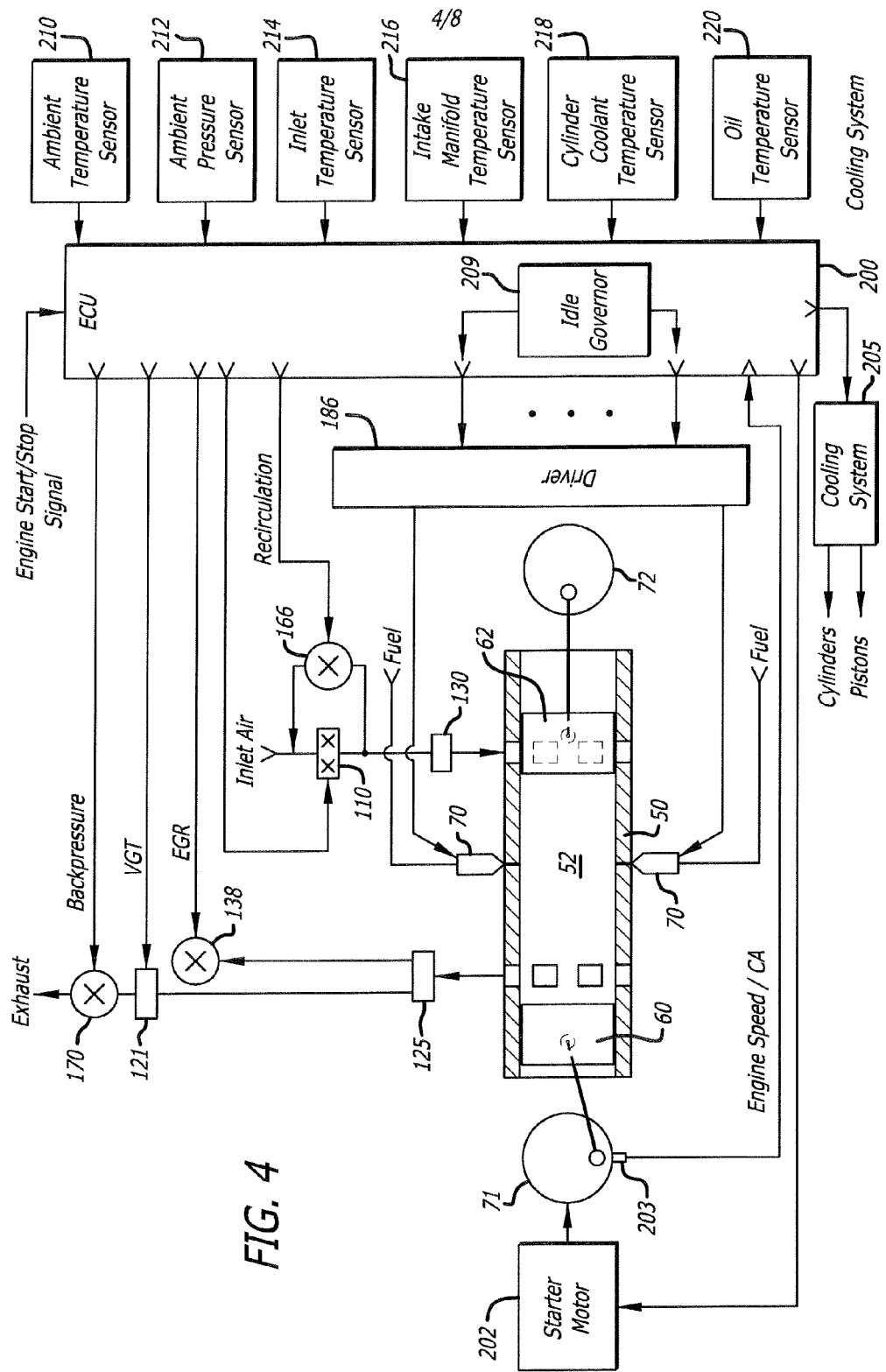
FIG. 4 is a schematic diagram illustrating a compression-ignition, opposed-piston engine equipped with a cold-start system according to this disclosure.

As seen in FIG. 4, an engine control unit (ECU) 200 may be configured to control charge air flow and the amount of exhaust gas mixed with the pressurized charge air in response to specified engine operating conditions by automatically operating the valves 138, 166, and 170 (and, possibly other valves), the supercharger 110, if a multi-speed or variable speed device is used, and the turbo-charger 121, if a variable-geometry device is used. Of course, operation of valves and associated elements used for EGR can include any one or more of electrical, pneumatic, mechanical, and hydraulic actuating operations. For fast, precise automatic operation, it is preferred that the valves be high-speed, computer-controlled devices with continuously-variable settings. Each valve has a state in which it is open (to some setting controlled by the ECU 200) to allow gas to flow through it, and a state in which it is closed to block gas from flowing through. In some aspects, the ECU 200 may be configured to control and operate the air handling system in a manner based on the disclosure in related U.S. patent application Ser. No. 14/039,856.

As per FIGS. 3 and 4, the ECU 200 may be configured to control a fuel injection mechanization according to fuel injection control schedules in response to measured parameter values obtained from engine sensors. These control schedules cause the generation of output control signals that are coupled to the reservoir 182, the pump 183, and the injector driver 186. In response to the control signals, the injector driver 186 generates drive signals on separate dedicated channels to operate the fuel injectors 50. In some aspects, the ECU 200 may be configured to control and operate the fuel injection system 180 in a manner based on the disclosure in related U.S. patent application Ser. No. 13/654,340.

Cold Start Strategies for an Opposed-Piston Engine

With reference to FIG. 4, a cold-start system for a two-stroke cycle opposed-piston engine with one or more cylinders that is configured to operate the engine's air handling, fuel, and thermal management systems includes the ECU 200, a starter motor 202, the valves 138, 166, and 170, and fuel injectors 70. In some aspects, the cold start system further includes a variable speed supercharger 110 and/or variable geometry turbine 121.

The air handling system includes a set of sensors that indicate current conditions relating to gas flow and combustion; other engine sensors indicate current conditions relating to ambient conditions, engine speed, and thermal management of engine cooling and lubrication systems. A subset of sensors, including air handling, thermal management, and other sensors provide environmental and engine data to the ECU 200 that is used by the ECU to control the execution of a cold-start strategy. As seen in FIG. 4, this set includes an ambient temperature sensor 210, an ambient pressure sensor 212, an inlet temperature sensor 214, an intake temperature sensor 216, a cylinder coolant temperature sensor 218, and an oil temperature sensor 220. The sensors 210 and 212 are external to the engine and sense, respectively, thermal and atmospheric conditions of the ambient environment. As per FIG. 2, the inlet temperature sensor 214 is placed upstream of the filter 150 in order to sense the thermal condition of inlet air flowing into the air handling system. As seen in FIG. 2, the intake temperature sensor 216 is located in the intake manifold 130, where it gauges the temperature of the charge air entering the cylinder intake ports. Temperature data reported by the sensors 218 and 220 indicate the thermal state of the engine itself.

Using environmental data provided by these (and, possibly, other) sensors, the ECU 200 is enabled by programming to detect a cold start condition (C_S) as a function of a set of engine operating parameters. These parameters include ambient temperature ($t_a$), ambient pressure ($p_a$), inlet temperature ($t_{il}$), intake temperature ($t_{ik}$), coolant temperature ($t_c$), and oil temperature ($t_o$) (and, possibly, others). In other words: $C\_S = f(t_a, p_a, t_{il}, t_{ik}, t_c, t_o, \ldots)$. These parameters are useful during engine start-up to distinguish circumstances in which a cold-start strategy is not needed from those in which a cold-start strategy is very desirable. For example, a cold-start strategy may not be needed to start a recently-stopped, and still warm, engine on a cold day. In another example, a cold start strategy is almost certainly indicated for starting an engine on a cold winter morning after the engine has been stopped for a long period (overnight, for example) in subzero ambient conditions. However, it may be the case that overnight shut-down of the same engine during a warm Indian summer period will not lower the internal temperatures of the engine to a level that necessitates a cold-strategy start-up of an engine on a cool fall morning.

Figure 5:
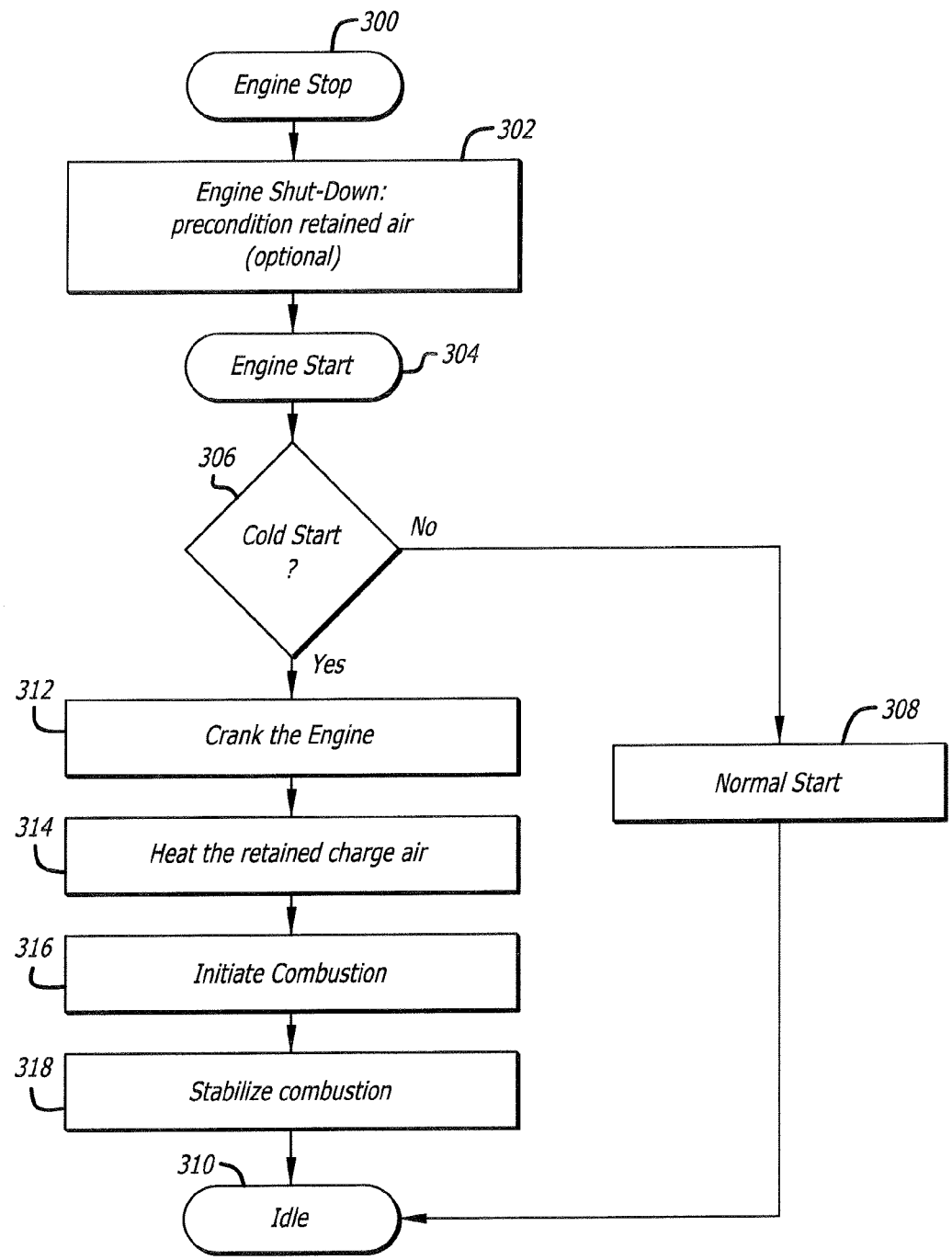
FIG. 5 is a flow diagram illustrating cold-start procedures implemented by operation of a cold-start system according to FIG. 4.

FIG. 5 illustrates an example of a method by which cold-start procedures are performed using elements of the cold-start system of FIG. 4 in operating a two-stroke cycle, compression-ignition, opposed-piston engine. Referring now to both figures, presume that the engine is installed in a vehicle equipped with an engine start/stop mechanism such as an electro-mechanical or a fully electrical key system capable of providing an engine Start/Stop signal to the ECU 200. Presume that the engine is running when a Stop signal is received at step 300. At this point, the ECU 200 initiates a shut-down sequence. In some aspects, but not necessarily, the shut-down sequence may include a process that preconditions air retained in the engine when it stops.

Thus, in response to the Stop signal, the charge air in the cylinder 50 may be optionally preconditioned to prepare for a subsequent start; in this regard, the charge air may be brought to a desired level of purity by reduction or elimination of exhaust products that it may otherwise contain when the engine stops. In step 302, if the preconditioning option has been elected, the ECU 200 initiates the following actions during engine shut down: first, it closes the EGR valve 138 to block the flow of exhaust gas through the EGR channel and into the charge air subsystem, and then it shuts down delivery of fuel to, and operation of, the injectors 70. Next, the ECU 200 closes the supercharger bypass valve 166 and opens the exhaust backpressure valve 170. If the turbine 122 is a variable geometry device, the ECU fully opens the turbine to maximize exhaust flow therethrough. This maximizes the flow of charge air into and through the cylinder 50, while simultaneously flushing exhaust gas from the cylinder. The result is that the air remaining in the cylinders of the engine is undiluted with exhaust and produces a more nearly stoichiometric result when mixed with fuel during a subsequent start.

On receipt of a Start signal following shut down (step 304), the ECU 200 at step 306 surveys the cold-start parameters ($t_a$, $p_a$, $t_{il}$, $t_{ik}$, $t_c$, $t_o$, ...) and decides whether or not to perform a cold-start procedure. If not, the ECU 200 uses normal start procedures at step 308 to start the engine, which places the engine in an idle state of operation at step 310. Otherwise, the engine is assumed to be in a cold-start state and a cold-start procedure is commenced at step 312.

At step 312, before causing fuel to be injected, the ECU 200 initiates engine cranking by activating a starter motor 202. Engine speed and a count of revolutions are determined by the ECU 200 based on crank angle (CA) data reported by an engine speed sensor 203 that monitors movement of the crankshaft 71. At step 314, actions are taken to heat up the charge air before fuel is injected and while the engine is being cranked by the starter motor 202. In this regard, the ECU 200 closes the EGR valve 138 and the back-pressure valve 170 (and the turbine 121, if a variable geometry device is used) and sets the recirculation valve 166 to limit the flow of charge air through the engine, while operating the starter motor 202 to crank the engine, without injecting fuel, for a specified number of revolutions of the crankshaft 71, as determined by the ECU 200. In limiting the flow of charge air, the recirculation valve 166 may be fully open so that, with the backpressure valve 170 closed, charge air flow through the cylinders is minimized, if not blocked. In some alternative aspects, the ECU 200 may be configured to partially close the supercharger bypass valve 166 so as to achieve a pre-injection boost pressure target inside the intake manifold 130. In these aspects, the supercharger will not only cause the charge air to heat up in the compression process but will also provide a higher starting pressure for the compression of retained air, which will lead to an even higher temperature inside the cylinder. In either case, engine cranking causes the pistons to reciprocate, thereby heating the charge air by a sequence of unfueled compressions. In some instances, the ECU 200 may also set control of the cooling system 205 to block the flow of liquid coolant to the cylinders (cooled by water, for example) and/or the pistons (cooled by oil, for example), which prevents the heat resulting from compression being conducted away from the cylinder and pistons. This process allows for a build-up in the combustion wall temperatures and a build-up in the temperature of the charge air retained in the cylinders.

After the specified number of crankshaft revolutions is counted, the ECU 200 shuts off the starter motor 202 while initiating combustion at step 316. The ECU triggers the first fuel injection by the injectors 70 at a pre-determined timing based on the specified number of engine revolutions. The first fuel injection is defined by a cold-start schedule defining a split injection method comprising one or more main injections and a sequence of sub-injections, at a pre-determined injection pressure and predetermined quantities. For example the main injection timing could be set to 10 degrees CA before minimum volume, with two pilot injections preceding it by 10 degrees CA and the fuel pressure set to 600 Bar. The fuel quantity injected at each combustion event in each cylinder is higher than an idle quantity so as to ensure that the engine speed quickly approaches an idle speed set point.

At step 318, the ECU 200 may be configured to stabilize combustion by way of an idle governor 209, a routine included in the programing of the ECU 200 that regulates engine speed. In this regard, the idle governor 209 causes the fuel quantity injected via the injectors 70 to achieve and maintain a predetermined idle speed. During stabilization, injection timing is retarded at step 318 more so than during the initial combustion events at step 316. For example, the main injection may now occur at 5 degrees CA before minimum volume while the pilot injections continue to occur at 10 degrees CA before the main injection. In these instances, the rail pressure may be reduced to 400 Bar for example to minimize combustion noise. This happens while the ECU 200, using a pre-determined mass flow schedule, causes the back-pressure valve 170 to progressively move to a more open position and the supercharger bypass valve 166 to progressively move to a more closed position, so as to replenish the combustion chamber with the enough fresh charge air to guarantee combustion stability. In some aspects, the ECU 200 may be configured to transition control of the air handling system to a closed-loop idle governor process that targets specific boost pressure, air mass flow, and EGR rate targets by automatically controlling the supercharger bypass valve 166, exhaust back-pressure valve 170 (and/or, the VGT 121, if equipped), and the EGR valve 138 positions. Finally, in step 310, the ECU 200 may be configured to activate the cooling system 205 so as to manage warm-up of the cylinders, pistons, and other engine components.

An example of cold-start scheduling of air flow through, and delivery of fuel to, the engine during a cold-start procedure is presented in Table I.

TABLE I

Cold-Start Scheduling of Air Flow and Fuel Delivery

|  | Step 302 | Steps 312 and 314 | Step 316 | Step 318 | Idling State |
|---|---|---|---|---|---|
| Fuel quantity (mg/injection) | 0 | 0 | 35 | 20 | 15+ |
| Engine Speed (RPM) | Decreasing to 0 | 100-300 | 100-300 | 800 | 800+ |
| Supercharger Bypass 166 | Closed | Open | Controlled to meet a boost target | Controlled to meet a boost target | Controlled to meet a boost target |
| EGR Valve 138 | Closed | Closed | Controlled to meet an EGR target | Controlled to meet an EGR target | Controlled to meet an EGR target |
| Backpressure Valve 170 (or VGT) | Open | Closed | Controlled to meet an air flow target | Controlled to meet an air flow target | Controlled to meet an air flow target |
| Fuel Injection Pressure (Bar) | Decreasing to 0 | 600 | 600 | 400 | 400+ |
| Main injection timing[1] | No fuel injection | No fuel injection | 10 | 5 | 20-0 |
| Pilot Injection(s)[2] | No fuel injection | No fuel injection | 10 | 10 | 5-20 |

[1] in degrees CA before minimum volume
[2] in degrees CA before main injection

Figure 6:
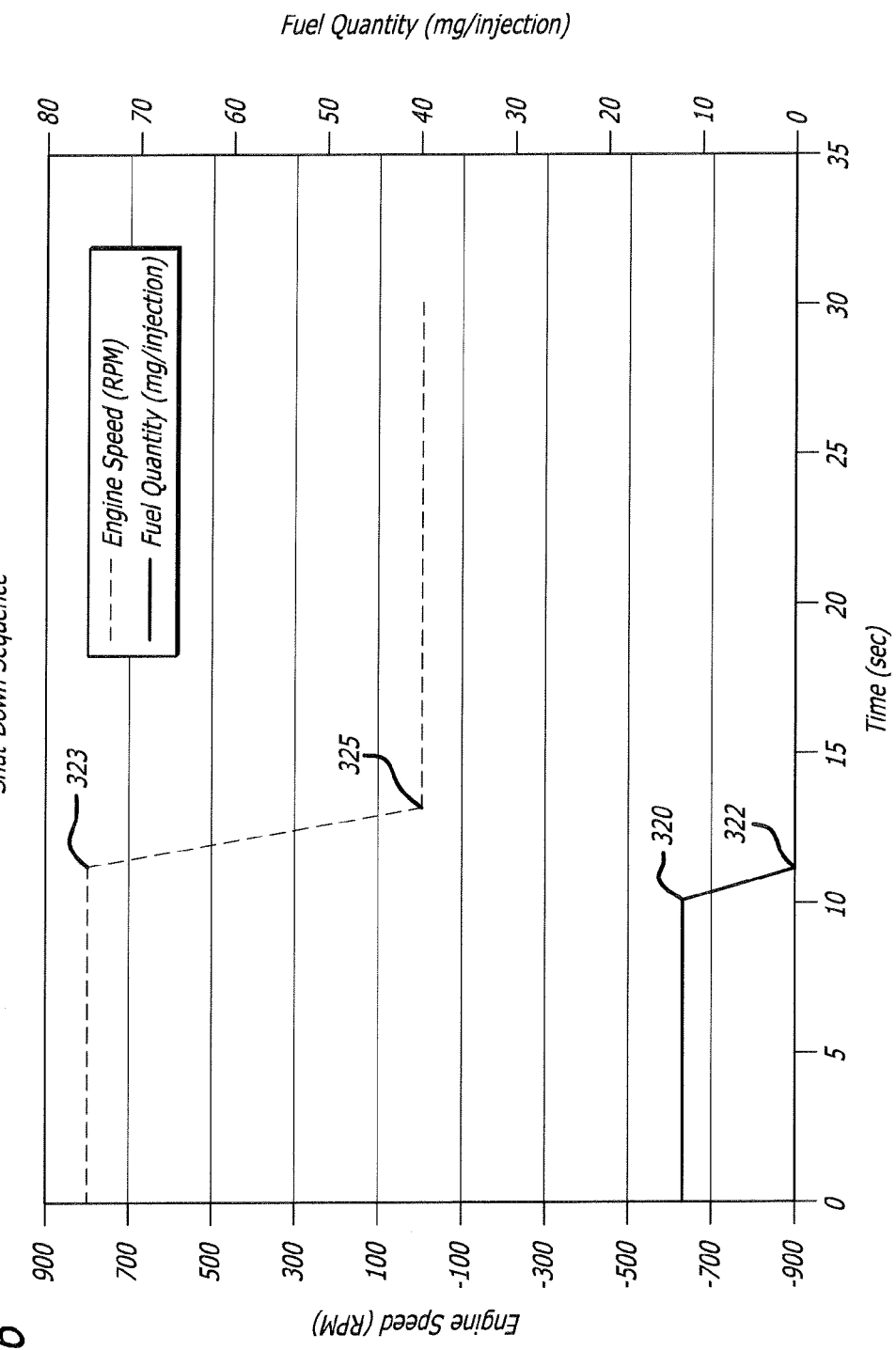
FIG. 6 is a graph showing an example of fuel delivery during a shut-down phase of a compression-ignition, opposed-piston engine.

In FIG. 6, engine speed and the rate of fuel delivered to a cylinder during engine shut-down are plotted against time. With reference to FIGS. 4, 5, and 6, the ECU 200 may be configured to cause fuel injection to stop at 320 when engine shut-down begins. When the rate of injection declines to zero at 322, engine speed begins to drop sharply at 323, finally ceasing at 325. With no combustion taking place, no exhaust or boost air being recirculated, and the exhaust subsystem fully open during the short time it takes for the engine to cease turning, exhaust-free charge air is pumped by the supercharger 110 to the intake manifold 139, and flows from there to the cylinders. The result is a cleansing flow of charge air through the cylinders.

Figure 7:
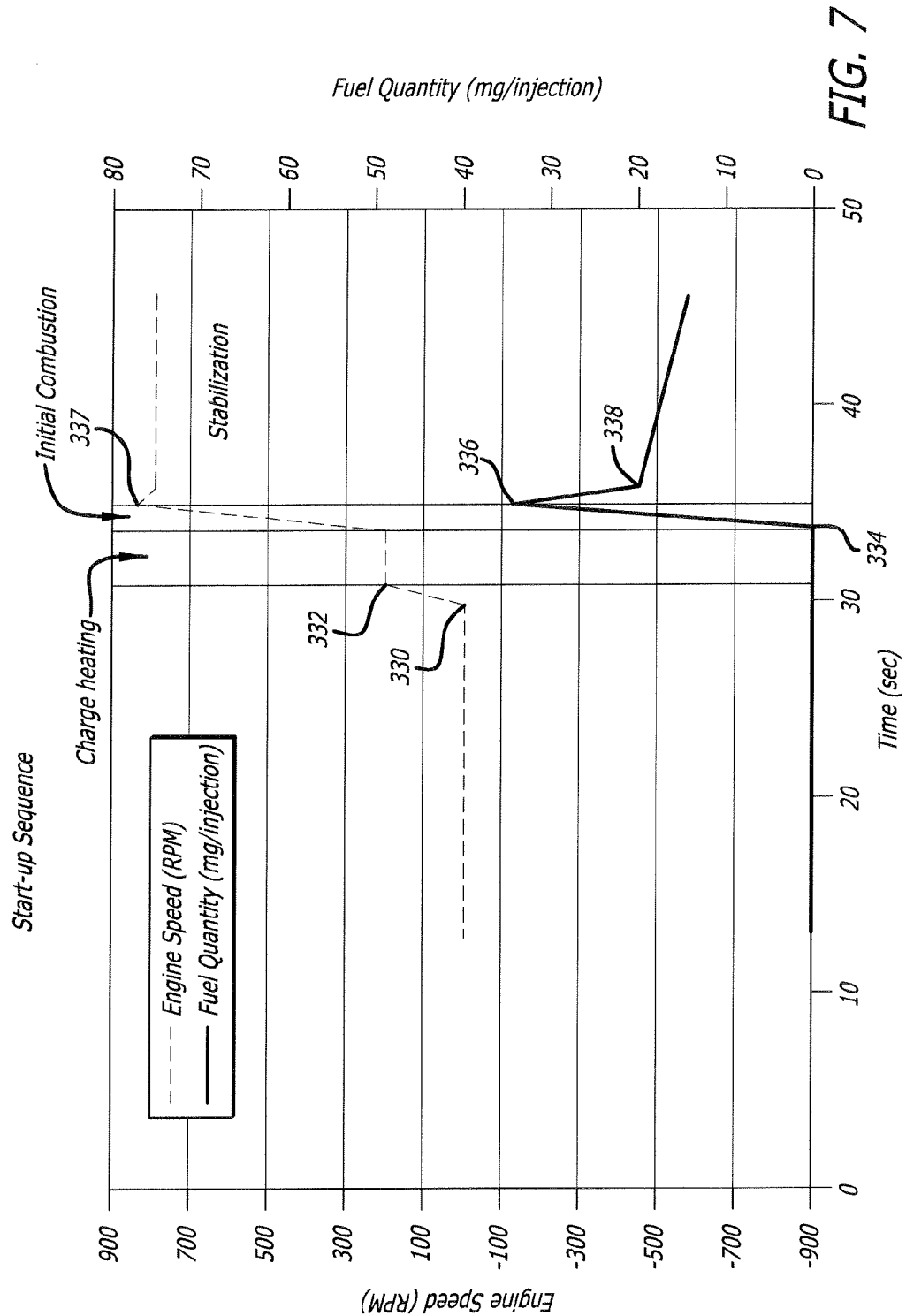
FIG. 7 is a graph showing an example of fuel delivery while cold-starting a compression-ignition, opposed-piston engine

In FIG. 7, engine speed and the rate of fuel delivered to a cylinder during engine shut-down are plotted against time. With reference to FIGS. 4, 5, and 7, the ECU 200 may be configured to cause the cold-start system elements to perform cold-start procedures that quickly and effectively elevate combustion temperatures to a level that results in stable combustion and low emissions. Desirably, the fast advance to high combustion temperature ensures elevated exhaust temperature as is needed to quickly light off after-treatment catalyst devices. Thus, at 330, the ECU 200 causes the starter motor 202 to begin cranking the engine. At 332, after a predetermined number of cranks increase engine speed to a predetermined level, and while no fuel is injected, the ECU 200 causes the valves 138 and 170 to close and the valve 166 to open, thereby minimizing airflow, which causes heating of air retained in the cylinders 50 in the portion of the graph labeled "Charge Heating". In the "Initial Combustion" section of the graph, at 334, the ECU 200 causes fuel to be injected at a rapidly increasing rate according to a cold-start split fuel injection schedule that is followed for all cylinders, which initiates and rapidly intensifies combustion until an injection peak is reached at 336. This causes the engine speed to ramp upwardly to a peak at 337. The ECU 200 may be configured to cause a transition to stabilization of combustion ("Stabilization") by progressively reducing the rate of fuel injection from 336 to 338 where a maximum point in an injection rate range in an idling schedule is reached. From 338, the ECU may be configured to reduce the rate of fuel injection according to an idling schedule so as to reach (or maintain) an engine idling speed target, and the graph shows engine speed falling from the peak at 337, to an idling speed of about 800 RPM. As per Table I, from initialization, through stabilization to idling, the ECU 200 may be configured to control the valves 170 and 166 so as to continually replenish the combustion chamber with enough fresh charge air to achieve and maintain combustion stability. As per Table I, from initialization, through stabilization to idling, the ECU 200 may be configured to control the EGR valve 138 so as to recirculate exhaust products to the charge air subsystem in enough quantity to achieve and maintain low levels of NOx emissions.

Those skilled in the art will realize that the cold-start schedules illustrated in Table I and the graphs of FIGS. 6 and 7 are for illustration only and are not limiting.

Figure 8:
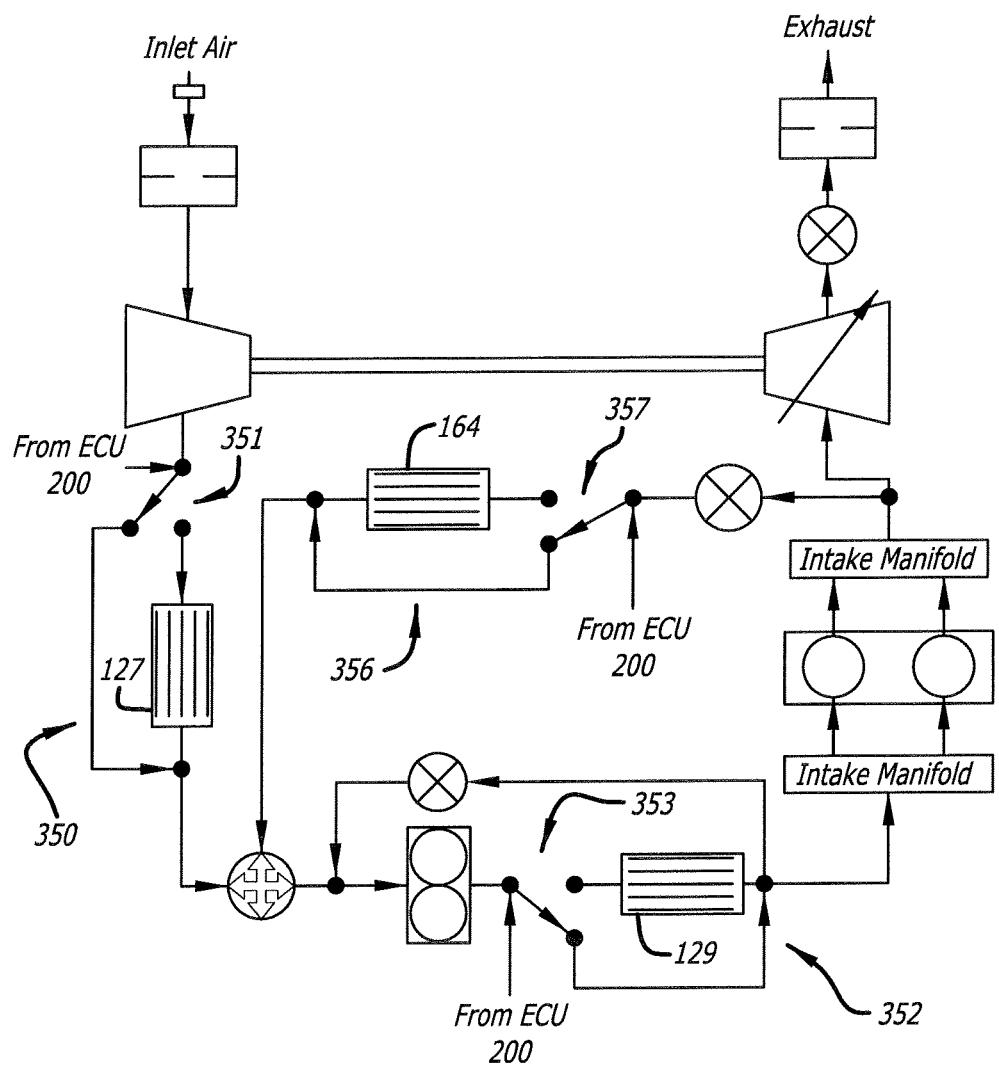
FIG. 8 is a schematic diagram illustrating optional additional elements for a cold-start system according to the this disclosure.

FIG. 8 illustrates additional options that may be incorporated into the cold-start system of FIG. 4. In this regard, the cold-start system may include one or more of a charge air cooler bypass path in the charge air subsystem and an EGR cooler bypass path in the EGR channel (if an EGR cooler is provided). In some aspects there may be a bypass path 350 for the cooler 127 and/or a bypass path 352 for the cooler 129. If provided, the bypass path 350 is opened or closed by a three-way valve 351; if provided, the bypass path 352 is opened or closed by a three-way valve 353. The ECU 200 may be configured to control the position of either or both of the three-way valves 351 and 353 so as to open or close the cooler bypass path that it controls. When open, a cooler bypass path conducts charge air through a cooler; when closed the bypass path conducts charge air around a cooler. Thus, the ECU 200 may be further configured to suppress cooling of charge air beginning at step 314 (FIG. 5) by enabling charge air flow through either or both charge air cooler bypass paths 350 and 352 until the warm up phase of the idling state is reached.

As per FIG. 8, in some aspects, if the EGR channel includes the EGR cooler 164, there may be a bypass path 356 for the cooler 164. If provided, the bypass path 356 is opened or closed by a three-way valve 357. The ECU 200 may be configured to control the position of the three-way valve 357 so as to open or close the cooler bypass path 356. When open, the cooler bypass path 356 conducts exhaust gas through the cooler 164; when closed the bypass path 356 conducts exhaust gas around the cooler 164. Thus the ECU 200 may be further configured to suppress cooling of recirculated exhaust gas by enabling exhaust flow through the EGR cooler bypass path 356 beginning at step 316 (FIG. 5) until the idling state is reached.

The cold-start strategy embodiments that are described herein, and the systems and procedures with which they are implemented, are illustrative and are not intended to be limiting.

The invention claimed is:

1. A method of operating an opposed-piston engine with one or more cylinders, in which each cylinder has a piston-controlled exhaust port coupled to an exhaust subsystem and a piston-controlled intake port coupled to a charge air subsystem, a pair of pistons disposed for opposing movement in a bore of the cylinder, and one or more fuel injectors disposed for injecting fuel into the cylinder, the method comprising:
   receiving a signal to start the engine;
   detecting a cold-start condition, followed by:
   before fuel is injected, limiting charge air flow through the cylinder and heating air retained in the cylinder by cranking the engine;
   in which limiting charge air flow through the cylinder includes either the step of reducing or blocking gas flow through the exhaust subsystem and the charge air subsystem, or the steps of reducing or blocking gas flow through the exhaust subsystem and providing charge air to the cylinder at a target boost pressure; and then,
   injecting fuel into a combustion space between opposing end surfaces of pistons in the cylinder according to a cold-start schedule;
   providing a progressively increasing flow of charge air through the cylinder until an engine idling state is reached; and,
   injecting fuel into the combustion space according to an idling schedule.

2. The method of claim 1, in which the charge air subsystem includes a supercharger having an input and an output, an intake manifold coupled to the output of the supercharger and in fluid communication with the intake port, and a recirculation path coupling the output of the supercharger to the input of the supercharger, and reducing or blocking gas flow through the charge air subsystem includes increasing charge air flow through the recirculation path.

3. The method of claim 2, in which the charge air subsystem further includes a cooling device coupled in series between the output of the supercharger and an input to the recirculation path, further including, while cranking the engine, bypassing the cooling device by coupling the output of the supercharger directly to the input of the recirculation path until the idling state is reached.

4. The method of claim 1, in which the exhaust subsystem includes a backpressure valve for adjusting gas flow through the exhaust subsystem, and reducing or blocking gas flow through the exhaust subsystem includes closing the backpressure valve.

5. The method of claim 4, in which the charge air subsystem includes a supercharger having an input and an output, an intake manifold coupled to the output of the supercharger and in fluid communication with the intake port, and a recirculation path coupling the output of the supercharger to the input of the supercharger, and reducing or blocking gas flow through the charge air subsystem includes increasing charge air flow through the recirculation path.

6. The method of claim 5, in which providing an increasing flow of charge air through the cylinder includes progressively opening the backpressure valve and progressively reducing charge air flow through the recirculation path, according to a cold start schedule until the idling state is reached.

7. The method of claim 6, in which the engine further includes an EGR channel coupling the exhaust subsystem to the charge air subsystem, and the step of receiving the start signal is preceded by:
   receiving an engine shut-down signal, followed by:
   pre-conditioning air includes blocking the flow of exhaust gas through the EGR channel, followed by opening the exhaust subsystem and the charge air subsystem.

8. The method of claim 7, further comprising blocking circulation of liquid coolant to the cylinders or the pistons until the engine idling state is reached.

9. A cold-start system for an opposed-piston engine with one or more cylinders, in which each cylinder has a piston-controlled exhaust port coupled to an exhaust subsystem and a piston-controlled intake port coupled to a charge air subsystem, a pair of pistons disposed for opposing movement in a bore of the cylinder, and one or more fuel injectors disposed for injecting fuel into the cylinder, comprising:
   a starter motor operable to crank the engine during start-up;
   a backpressure valve in the exhaust subsystem;
   the charge air subsystem including a supercharger having an input and an output, an intake manifold coupled to the output of the supercharger and in fluid communication with the intake port, and a recirculation path coupling the output of the supercharger to the input of the supercharger; and,
   an engine control mechanization operable to detect a cold-start condition and to operate the starter motor, the backpressure valve, the recirculation path, and the fuel injectors in response to the cold-start condition by:
      closing the backpressure valve and opening the recirculation path to reduce or block charge air flow through the cylinder and cranking the engine to heat air by compression in the cylinder before fuel is injected, followed by:
      causing the fuel injectors to inject fuel into a combustion space defined between opposing end surfaces of pistons in the cylinder according to a cold-start schedule, and progressively opening the backpressure valve and closing the recirculation path to increase the flow of charge air through the cylinder until an engine idling state is reached.

10. The cold-start system of claim 9, further including an EGR channel coupling the exhaust subsystem to the charge air subsystem, and wherein the engine control mechanization is operable to limit the flow of exhaust gas through the EGR channel until the idling state is reached.

11. The cold-start system of claim 10, further including one or more of a variable geometry turbine in the exhaust subsystem, a charge air cooler bypass path in the charge air subsystem, and an EGR cooler bypass path in the EGR channel, and wherein the control mechanization is further operable to perform one or more of:
   configuring the variable geometry turbine to limit the flow of gas until the idling state is reached;
   enabling charge air flow through the charge air cooler bypass path until the idling state is reached; and,
   enabling exhaust flow through the EGR cooler bypass path until the idling state is reached.

12. A method of operating an opposed-piston engine with an exhaust subsystem, a charge air subsystem, an EGR channel coupling the exhaust subsystem to the charge air subsystem, and one or more cylinders, in which each cylinder has a piston-controlled exhaust port coupled to the exhaust subsystem and a piston-controlled intake port coupled to the charge air subsystem, a pair of pistons disposed for opposing movement in a bore of the cylinder, and one or more fuel injectors disposed for injecting fuel into the cylinder, the method comprising:
   receiving an engine start signal;
   detecting a cold-start condition and responding to the cold-start condition by:
      blocking the flow of exhaust gas through the EGR channel; and then,
      before fuel is injected, limiting charge air flow through a cylinder and heating conditioned air in the cylinder by cranking the engine, followed by:
      ceasing cranking while injecting a cold-start sequence of fuel pulses into the cylinder and increasing the flow of charge air through the cylinder, until an engine idling state is reached; and,
      injecting an idling sequence of fuel pulses into the cylinder.

13. The method of claim 12, further including blocking circulation of liquid coolant to the cylinders or the pistons until the engine idling state is reached.

14. The method of claim 12, in which limiting charge air flow through the cylinders includes the step of blocking exhaust flow through the exhaust subsystem, and either the step of blocking charge air flow through the charge air subsystem, or the step of causing charge air to flow to the cylinder at a target boost pressure.

15. The method of claim 14, in which the charge air subsystem includes a supercharger having an input and an output, an intake manifold coupled to the output of the supercharger and in fluid communication with the intake port, and a recirculation path coupling the output of the supercharger to the input of the supercharger, and blocking charge air flow through the charge air subsystem includes increasing charge air flow through the recirculation path.

16. The method of claim 15, in which the exhaust subsystem includes a backpressure valve for adjusting gas flow through the exhaust subsystem, and blocking gas flow through the exhaust subsystem includes closing the backpressure valve.

17. The method of claim 16, in which providing an increasing flow of charge air through the cylinder includes progressively opening the backpressure valve and progressively reducing charge air flow through the recirculation path according to a cold-start schedule until the idling state is reached.

18. A method of operating an opposed-piston engine with an exhaust subsystem, a charge air subsystem, an EGR channel coupling the exhaust subsystem to the charge air subsystem, and one or more cylinders, in which each cylinder has a piston-controlled exhaust port coupled to the exhaust subsystem and a piston-controlled intake port coupled to the charge air subsystem, a pair of pistons disposed for opposing movement in a bore of the cylinder, and one or more fuel injectors disposed for injecting fuel into the cylinder, the method comprising:
   during shut-down of the engine, closing the EGR channel, and then ceasing fuel injection into the cylinder and flushing exhaust products from the cylinder; followed by,
   detecting a cold-start condition in response to an engine start signal and responding to the cold-start condition by:

closing the EGR channel; followed by, before fuel is injected, closing the exhaust subsystem and providing pressurized charge air to a cylinder and heating the pressurized charge air in the cylinder by cranking the engine, followed by:

injecting a cold-start sequence of fuel pulses into the cylinder while progressively increasing the flow of exhaust gas through the exhaust subsystem and progressively increasing the flow of charge air to the cylinder, until an engine idling state is reached; and then, injecting an idling sequence of fuel pulses into the cylinder.

19. A method of operating an opposed-piston engine with one or more cylinders, in which each cylinder has a piston-controlled exhaust port coupled to an exhaust subsystem and a piston-controlled intake port coupled to a charge air subsystem, a pair of pistons disposed for opposing movement in a bore of the cylinder, and one or more fuel injectors disposed for injecting fuel into the cylinder, in which the engine further includes an EGR channel coupling the exhaust subsystem to the charge air subsystem, the method comprising:

receiving an engine shut-down signal;

preconditioning air retained in the engine by blocking the flow of exhaust gas through the EGR channel, followed by opening the exhaust subsystem and the charge air subsystem; and then, receiving a signal to start the engine;

detecting a cold-start condition, followed by:

before fuel is injected, limiting charge air flow through the cylinder and heating air retained in the cylinder by cranking the engine; and then, injecting fuel into a combustion space between opposing end surfaces of pistons in the cylinder according to a cold-start schedule;

providing a progressively increasing flow of charge air through the cylinder until an engine idling state is reached; and, injecting fuel into the combustion space according to an idling schedule.

20. A method of operating an opposed-piston engine with one or more cylinders, in which each cylinder has a piston-controlled exhaust port coupled to an exhaust subsystem and a piston-controlled intake port coupled to a charge air subsystem, a pair of pistons disposed for opposing movement in a bore of the cylinder, and one or more fuel injectors disposed for injecting fuel into the cylinder, the method comprising:

receiving a signal to start the engine;

detecting a cold-start condition, followed by:

before fuel is injected, limiting charge air flow through the cylinder and heating air retained in the cylinder by cranking the engine; and then, injecting fuel into a combustion space between opposing end surfaces of pistons in the cylinder according to a cold-start schedule;

providing a progressively increasing flow of charge air through the cylinder and blocking circulation of liquid coolant to the cylinders or the pistons until an engine idling state is reached; and, injecting fuel into the combustion space according to an idling schedule.

* * * * *